United States Patent
Kasslin et al.

(10) Patent No.: US 9,342,694 B2
(45) Date of Patent: May 17, 2016

(54) SECURITY METHOD AND APPARATUS

(75) Inventors: Kimmo Kasslin, Helsinki (FI); Pavel Turbin, Jokela (FI)

(73) Assignee: F-Secure Corporation, Helsinki (FI)

( * ) Notice: Subject to any disclaimer, the term of this patent is extended or adjusted under 35 U.S.C. 154(b) by 0 days.

(21) Appl. No.: 14/131,004

(22) PCT Filed: Jul. 6, 2011

(86) PCT No.: PCT/IB2011/052994
§ 371 (c)(1),
(2), (4) Date: Jan. 6, 2014

(87) PCT Pub. No.: WO2013/005079
PCT Pub. Date: Jan. 10, 2013

(65) Prior Publication Data
US 2014/0137253 A1    May 15, 2014

(51) Int. Cl.
*H04L 29/00* (2006.01)
*G06F 21/56* (2013.01)
*G06F 21/57* (2013.01)

(52) U.S. Cl.
CPC .............. *G06F 21/56* (2013.01); *G06F 21/564* (2013.01); *G06F 21/568* (2013.01); *G06F 21/575* (2013.01)

(58) Field of Classification Search
CPC .................................. G06F 11/30; G06F 12/14
USPC .......................................................... 726/24
See application file for complete search history.

(56) References Cited

U.S. PATENT DOCUMENTS

| 5,509,120 | A | 4/1996 | Merkin et al. ................ 395/186 |
| 6,802,028 | B1 | 10/2004 | Ruff et al. ........................ 714/38 |
| 7,665,123 | B1 | 2/2010 | Szor et al. ......................... 726/2 |
| 8,417,962 | B2 * | 4/2013 | Novak et al. ................... 713/188 |
| 8,713,686 | B2 * | 4/2014 | Kane ............................... 726/26 |
| 2006/0041738 | A1 | 2/2006 | Lai ..................................... 713/2 |
| 2006/0236399 | A1 | 10/2006 | Han ................................. 726/24 |

* cited by examiner

*Primary Examiner* — Brandon Hoffman
*Assistant Examiner* — Michael D Anderson
(74) *Attorney, Agent, or Firm* — Harrington & Smith

(57) ABSTRACT

In accordance with an example embodiment of the present invention, there is provided an apparatus, comprising: at least one processor; and at least one memory including executable instructions. The at least one memory and the executable instructions are configured to, in cooperation with the at least one processor, cause the apparatus to perform at least the following: during the loading of an operating system, loading a boot time driver installed by an anti-virus application; reading a master boot record data by the boot time driver as soon as the operating system is ready to handle the request for reading the master boot record data; analyzing the collected master boot record data to identify any malicious entities; and in the event that malicious entities are identified, controlling the behavior of the processing system in order to disable the malicious entity.

14 Claims, 2 Drawing Sheets

SECURITY METHOD AND APPARATUS

TECHNICAL FIELD

The exemplary and non-limiting embodiments of the present application relate generally to security methods, apparatuses and computer programs and, more specifically, to securing such apparatuses and computer systems against malware infections.

BACKGROUND

Malware, short for malicious software, is a term used to define malicious software that can be unwittingly installed on computers and computer systems. Malware can be used by an attacker, for example, to disrupt the normal computer operation, to take control of a computer, or to collect confidential user information such as bank login details. In order to defend against malware attacks, a computer user may install an anti-virus application. Such applications employ a number of techniques to detect malware including searching for fingerprints of known viruses, and analyzing device and/or software behavior (including using rules or "heuristics" to identify suspicious behavior).

Malware has become more and more efficient against detection and removal by anti-virus engines. Malware may utilize kernel-level protection techniques by patching system drivers and integrating malicious code directly into low-level disk systems. Malware can also infect the contents of the master boot record (MBR) stored on the device. The MBR is the 512-byte boot sector, which is the first sector ("LBA Sector 0") of a partitioned data storage device. In a computer's hard disk drive, the MBR is the sector that the BIOS (stored in RAM memory) looks first for instructions what to do, when the computer is booted.

By installing malicious code into the MBR of a device, which is started ahead of the operating system (OS), an attacker may be able to install malware into the computer itself. An example of such malware is Rootkit MBR.TDSS.B. This malware is able to create its own file system that is located near to the end of the hard disk. The launch point of the malware may reside at the MBR of the disk and the malware is started together with an OS kernel. After the file system becomes available for the computer system, the malware patches a system driver and hooks access to the infected MBR. Thus, it is possible that an attempt to read the infected sector from a scanner driver or process is filtered by the malware. The malware may respond with an original, pre-infected, copy of the MBR as the result of the read attempt, thus fooling the scanner and remaining undetected. Such penetration method allows the malware to withstand an anti-virus scanner. Current detection and removal instructions instruct the user to boot the operating system from an external media (for example, bootable CD or USB) and to perform an offline disinfection. Such offline methods have poor usability and, moreover, the user may be unaware that the system is infected.

SUMMARY

The following presents a simplified summary of the invention and provides a basic understanding of some aspects of the invention. The summary is not an extensive overview of the invention, and does not identify key elements of the invention or specify the scope of the invention. Its sole purpose is to present some concepts of the invention in a simplified form as an introduction to the more detailed description that is presented later.

The claims describe various aspects of the invention.

According to one aspect of the present invention, there is provided a method of protecting a processing system against malware infection. The method comprises: during the loading of an operating system, loading a boot time driver that is installed by an anti-virus application; reading a master boot record data by the boot time driver as soon as the operating system is ready to handle the request for reading the master boot record data; analyzing the collected master boot record data to identify any malicious entities; and in the event that malicious entities are identified, controlling the behavior of the processing system in order to disable the malicious entity.

According to a second aspect of the present invention, there is provided an apparatus, comprising: at least one processor; and at least one memory including executable instructions, the at least one memory and the executable instructions being configured to, in cooperation with the at least one processor, cause the apparatus to perform at least the following: during the loading of an operating system, loading a boot time driver that is installed by an anti-virus application; reading a master boot record data by the boot time driver as soon as the operating system is ready to handle the request for reading the master boot record data; analyzing the collected master boot record data to identify any malicious entities; and in the event that malicious entities are identified, controlling the behavior of the processing system in order to disable the malicious entity.

According to a third aspect of the present invention, there is provided a computer program, comprising code for loading a boot time driver that is installed by an anti-virus application during the loading of an operating system; code for reading a master boot record data by the boot time driver as soon as the operating system is ready to handle the request for reading the master boot record data; code for analyzing the collected master boot record data to identify any malicious entities; and code for controlling the behavior of the processing system in order to disable the malicious entity in the event that malicious entities are identified, when the computer program is run on a processor.

All combinations of the various aspects, embodiments and features of the invention are possible and within the scope of the present invention as claimed.

BRIEF DESCRIPTION OF THE DRAWINGS

The accompanying drawings provide a more complete understanding of the embodiments of the present invention according to the following descriptions.

DETAILED DESCRIPTION OF THE DRAWINGS

Example embodiments of the present invention are later described in more detail with reference to the accompanying drawings, in which some embodiments of the invention are shown. The invention may be embodied in many different forms and should not be construed as limited to the embodiments set forth here. Although the specification may refer to "an", "one", or "some" embodiment in several locations, this does not necessarily mean that each such reference is to the same embodiment, or that the feature only applies to a single embodiment. Single features of different embodiments may also be combined to provide other embodiments.

The present invention can apply to any processing system, terminal, server, corresponding component, or to any computer system or combination of different communications systems that support the required functionality. Due to the rapid development of the specifications of computer systems and protocols that are used, all words and expressions should be interpreted broadly; they are intended only to illustrate the embodiment.

Figure 1:
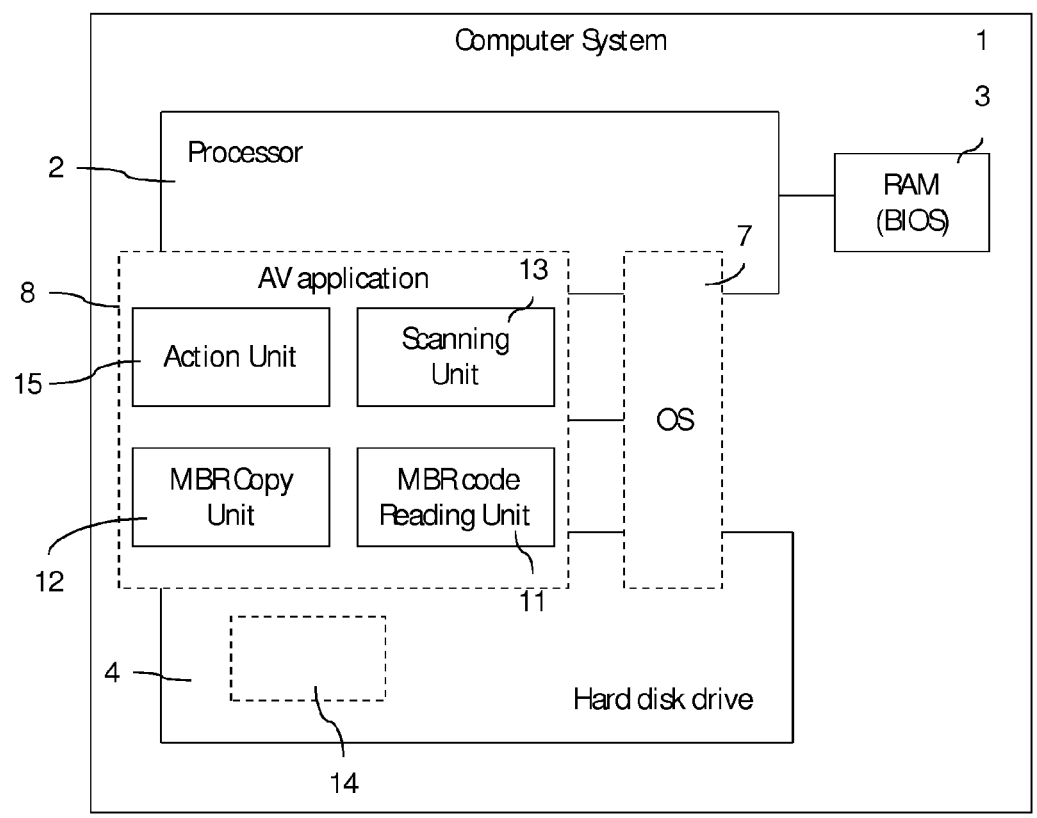
FIG. 1 shows a simplified block diagram that illustrates an example of apparatuses according to the invention.

FIG. 1 illustrates a general example of apparatuses in which the embodiments of the invention may be applied. It only shows the elements and functional entities that are required for understanding the arrangement according to an embodiment of the invention. Other components have been omitted for the sake of simplicity. The implementation of the elements and functional entities may vary from that shown in FIG. 1. The connections shown in FIG. 1 are logical connections and the actual physical connections may be different. It is apparent to a person skilled in the field that the arrangement may also comprise other functions and structures.

An embodiment of the invention can be realized using a computer system 1, as illustrated in FIG. 1, which is suitable for implementing the methods that are described below. The computer system 1 can be implemented as a combination of computer hardware and software. The computer system 1 comprises one or more processors 2, a RAM memory 3, and a hard disk drive 4. An operating system 7, for example a Windows operating system, is implemented by code stored on the hard disk drive 4 running on the processor 2. Code implementing a BIOS (Basic Input/Output System) is stored in the RAM 3. An anti-virus application 8 may also be implemented in use by code, stored in the hard disk drive 4, running on the processor. The computer system 1 may also comprise a transceiver (not shown) that is used to communicate over a network such as a LAN or the Internet. Typically, the computer system 1 may be a personal computer (PC), laptop, personal data assistant (PDA) or mobile phone, or any other suitable device.

The process of loading an operating system 7 into system memory may begin with the system BIOS invoking a boot loader from a boot volume. The boot loader loads the kernel of the OS and boot time drivers into system memory from the boot volume. A file system driver is loaded by a boot loader into system memory. The file system driver is the driver for the native file system of the OS 7.

In an embodiment, the anti-virus application 8 installs a boot time driver. During the loading of the OS 7, the boot time driver installed that is by the anti-virus application 8 is also loaded. The anti-virus application 8 comprises an MBR code reading unit 11 that is configured to read the MBR data by using the boot time driver as soon as the OS 7 is ready to handle the request for reading the MBR data. The collected MBR code may be analyzed in a scanning unit 13 of the anti-virus application 8 in order to identify any malicious entities within the MBR code. The anti-virus application 8 may make use of signatures and/or other features to identify suspect as well as trusted MBR code. This information may be stored in a memory portion 14 of the hard disk drive. The scanning unit 13 provides a result, for example trusted, malicious, suspicious, etc., to an action unit 15. In the event that malicious entities are identified, the behavior of the processing system may be controlled by the action unit 15 in order to disable the malicious entity. The action unit 15 is configured to take appropriate action depending upon the result that is determined.

In an embodiment, the anti-virus application 8 comprises an MBR copy unit 12 that is configured to create a clean copy of the MBR. The clean copy of the MBR is passed to the boot time driver, and in the event that malicious entities are identified in the MBR data, the infected MBR may be replaced with the clean copy of the MBR. The clean copy of the MBR may be stored in a system driver registry, for example.

The MBR launch point is very efficient from malware author's point of view. Therefore detecting and removing such malware, e.g. Trojans, is important. On an infected system, the viral loader may start working along with the infected driver. However, the viral loader code is unable to perform any modification or patching as long as the file system is not yet available. The resident loader code must wait for the file system notification to indicate that the file system is ready and only then it is able to patch one of the system drivers, for example atapi.sys. In the same time, the kernel loads the hard drive port driver, which is used by the operating system to load other system drivers including the file system drivers. There is a short time window after starting to load the boot driver and before malware patches the file system driver. In an embodiment, this time window is used to read the infected MBR, when the OS is not yet hooked by malware.

Figures 2, 3:
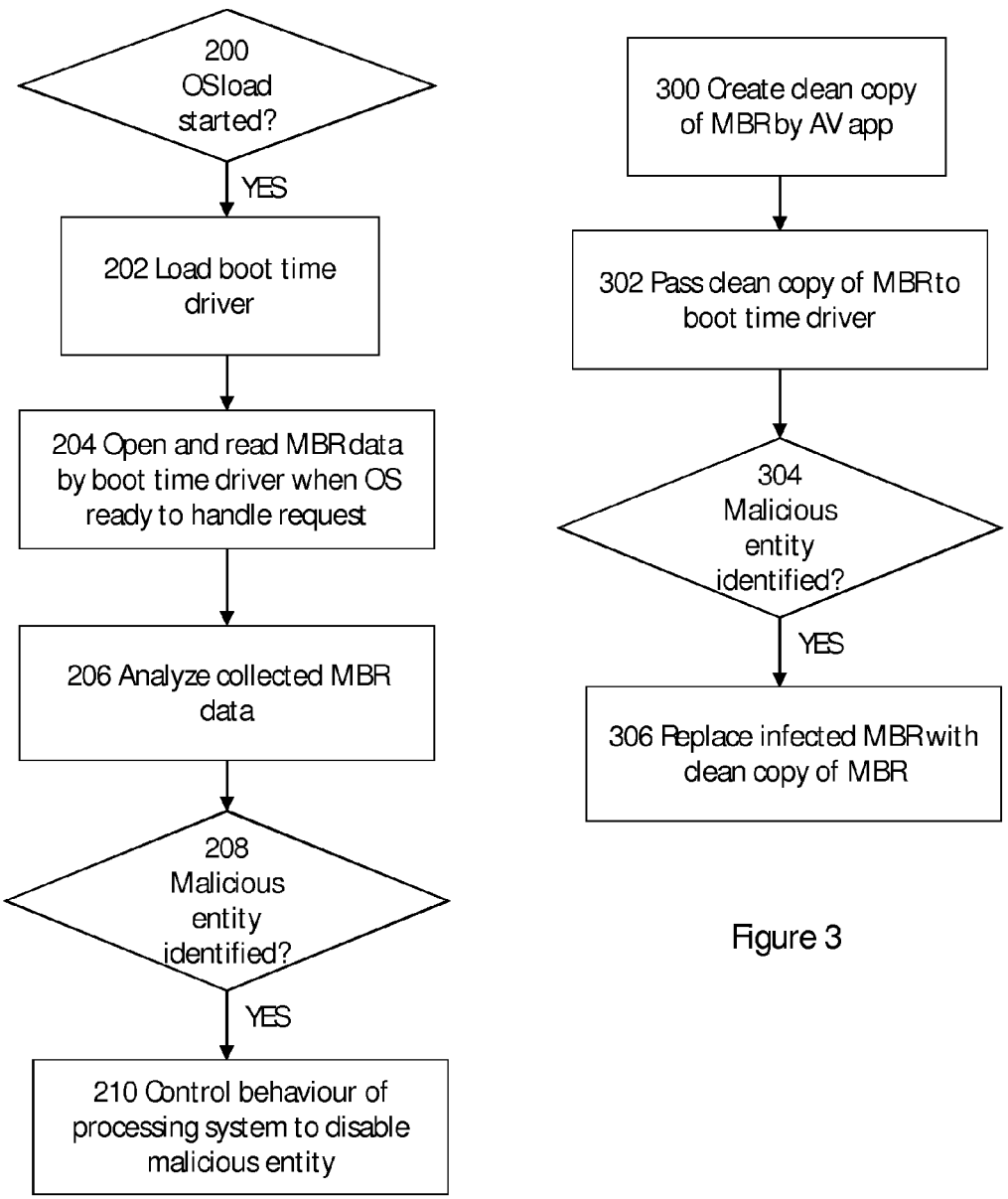
FIG. 2 shows an example of a method.
FIG. 3 shows another example of a method.

FIG. 2 is a flow diagram illustrating one example of a method of protecting a processing system against a malware infection. This employs the following steps:

200: If an operating system load is detected to start, then 202 is entered.

202: A boot time driver installed by an anti-virus application is loaded. In an embodiment, the driver has a start type 0, which means that the driver is loaded ahead of file system.

204: MBR data is read by the boot time driver as soon as the OS is ready to handle the request. Due to performance optimization of some systems, the boot time driver may be unable to read disk within a DriverEntry routine, and ZwCreateFile routine returns: a STATUS_OBJECT_PATH_NOT_FOUND error. The DriverEntry is the first routine that is called after a driver is loaded and it is responsible for initializing the driver. The ZwCreateFile is a routine that creates a new file or opens an existing file. In an embodiment, there are one (or more) of the following actions, depending upon the product configuration that can be used to enable the successful reading of the disk:

a) A notification routine, for example IoRegisterBootDriverReinitialization, can be used. This routine registers the driver's reinitialization callback routine to be called by an I/O manager after all the devices of the processing system have been enumerated and started.

b) A worker thread can be created and a timer can be fired with a short period to pool readiness of the disk reading.

c) A driver load notification can be installed, for example by using a routine called PsSetLoadImageNotifyRoutine that registers a driver-supplied callback that is subsequently notified whenever an image is loaded (or mapped into memory). The callback is invoked when the OS is loading the next driver. It is possible to catch the moment just ahead of file system driver being patched by possible malware.

Using one of the alternative methods above, the anti-virus boot time driver can open and read the raw disk data of the MBR, for example by using the ZwCreateFile routine. An example of a pseudocode that can be used for reading the MBR data is shown below:

```
BYTE MbrData[512];
HANDLE hDisk = ZwCreateFile(L"\\Device\\Harddisk0\\DR0");
ZwReadFile(hDisk, MbrData, sizeof(MbrData));
```

206: MBR data collected during the reading of the MBR is analyzed.

208: If any malicious entities are detected or identified during the analysis, then 210 is entered. The anti-virus application has typically a database of suspicious actions and malicious entities, and it scans the MBR code to determine if any of these are present. An example of a suspicious action may be the presence of instructions requiring reading and writing to the local hard drive of the device.

210: Behavior of the processing system is controlled in order to disable any malicious entities. The detection of a suspicious instruction or malicious entity in the MBR code causes the anti-virus application to take certain defensive actions. This can include one or more of the following actions, depending upon product configuration:
a) The anti-virus application causes a warning message to be displayed on the computer's display, indicating that the device contains active boot code. This option can be used for example where an advanced user is expected, e.g. network administrator. The user may then have the option to possibly modify the MBR on the device.
b) The anti-virus application saves a copy of the MBR into a local quarantine, and replaces the infected MBR on the device with a clean copy of the MBR if such exists.
c) The anti-virus application does not take any immediate action. However, the user may be offered an opportunity to shut down the device.

FIG. 3 is a flow diagram illustrating one example of how the behavior of the processing system can be controlled, for example in step 210 of FIG. 2. This process employs the following steps:

300: A clean copy of MBR is created by the anti-virus application. This can include one (or more) of the following actions, depending upon the product configuration:
a) A stored pattern copy of the MBR can be used. The generic clean copy of the MBR may be stored in an anti-virus database.
b) A user-mode reading of the master boot record can be performed. Since the malware responses with the original copy of the MBR, the returned copy can be used for the disinfection.
c) The changes made to the infected MBR copy can be reverted. In some scenarios malware simply puts "jump" instructions into the legit MBR. The anti-virus may replace the patched code with the clean one in order to restore the MBR.

302: The clean copy of the MBR is passed to the boot time driver. The boot time driver may store the copy in a system driver registry. The system driver registry is accessible in a very early stage of the booting process as it contains input for the driver configuration. The same registry can be used to store the clean copy of the MBR that is received from anti-virus.

304: If a malicious entity is detected or identified during the analysis (as in 206 of FIG. 2 example), then 306 is entered, for example, when malware is found during the boot phase, and a clean copy is known to be available.

306: The infected MBR is replaced with the clean copy of the MBR. An example of a pseudocode that can be used for replacing infected MBR with the clean copy of the MBR is shown below:

```
// assumed CleanMbrData is clean copy of MBR
HANDLE hDisk = ZwCreateFile(L"\\Device\\Harddisk0\\DR0");
ZwWriteFile(hDisk, CleanMbrData, sizeof(CleanMbrData));
```

After the clean copy of the MBR has been written, the system driver forces the system to reboot. The system is now booted from the clean copy and the malware is disabled.

Without in any way limiting the scope, interpretation or application of the claims appearing below, the technical effects of one or more of the example embodiments disclosed here reduce the security risks caused by malware on end user devices. Resources of the system can also be saved when there is no need for offline booting of the operating system when detecting and/or removing certain kind of malware, such as MBR-style rootkits. The described embodiments are also very reliable and generic.

The steps, points, signaling messages and related functions described above in relation to FIGS. 2 and 3 are in no absolute chronological order, and some of the steps may be performed simultaneously or in a different order. Other functions may also be executed between the steps or within the steps, and other signaling messages may be sent between the illustrated ones. Some of the steps can also be left out or replaced by a corresponding step. The system functions illustrate a procedure that may be implemented in one or more physical or logical entities.

The techniques described here may be implemented by various means. An apparatus or system that implements one or more of the described functions with an embodiment comprises not only existing means, but also means for implementing one or more functions of a corresponding apparatus that is described with an embodiment. An apparatus or system may also comprise separate means for each separate function. These techniques may be implemented in one or more modules of hardware or combinations thereof. For software, implementation can be through modules, for example, procedures and functions that perform the functions described here. The software code may be stored in any suitable data storage medium that is readable by processors, computers, memory units or articles of manufacture, and may be executed by one or more processors or computers. The data storage medium or memory unit may be implemented within the processor or computer, or as an external part of the processor or computer, in which case it can be connected to the processor or computer via various means known in the field.

The programming, such as executable code or instructions, electronic data, databases or other digital information can be stored into memories and may include a processor-usable medium. A processor-usable medium may be embodied in any computer program product or an article of manufacture which can contain, store, or maintain programming, data or digital information for use by or in connection with an instruction execution system, including the processor 2 in the exemplary embodiment.

An embodiment provides a computer program product that comprises a computer-readable medium bearing a computer program code that is embodied therein for use with a computer. The computer program code comprises a code for loading a boot time driver installed by an anti-virus application during the loading of an operating system; a code for reading a master boot record data by the boot time driver as soon as the operating system is ready to handle the request for reading the master boot record data; a code for analyzing the collected master boot record data to identify any malicious entities; and a code for controlling the behavior of the processing system in order to disable the malicious entity in the event that malicious entities are identified, when the computer program is run on a processor.

Embodiments of the present invention may be implemented in software, hardware, application logic or a combination of these. In an example of an embodiment, the application logic, software or a set of instructions is maintained on any conventional computer-readable media. In the context of this document, a "computer-readable medium" may be any media or means that can contain, store, communicate, propagate or transport the instructions for use by or in connection with an instruction execution system, apparatus, or device, such as a computer. A computer-readable medium may comprise a computer-readable storage medium that may be any media or means that can contain or store the instructions for use by or in connection with an instruction execution system, apparatus, or device, such as a computer.

The various aspects of the invention are not limited to the combinations explicitly set out in the independent claims. Other aspects of the invention may comprise combinations of features from the described embodiments, the dependent claims and the independent claims.

It is obvious to a person skilled in the field that, as the technology advances, the inventive concept can be implemented in various ways. The invention and its embodiments are not limited to the examples described above but may vary within the scope of the claims.

What is claimed is:

1. A method of protecting a processing system against malware infection, the method comprising:
   during the loading of an operating system, loading a boot time driver installed by an anti-virus application, wherein the boot time driver is installed ahead of a file system;
   reading a master boot record data by the boot time driver as soon as the operating system is ready to handle the request for reading the master boot record data, wherein the master boot record data is opened and read before a file system driver becomes available to the operating system, wherein the reading of the master boot record data is enabled by at least one of:
   using a notification routine that registers a reinitialization callback routine to be called by an I/O manager after all devices of the processing system have been enumerated and started,
   creating a worker thread and firing a timer with a short period to pool readiness of the reading, and
   installing a driver load notification callback that is invoked when the operating system is loading a next driver;
   analyzing the collected master boot record data to identify any malicious entities; and
   in the event that malicious entities are identified, controlling the behavior of the processing system in order to disable the malicious entity.

2. A method of claim 1, further comprising:
   creating a clean copy of the master boot record by the anti-virus application;
   passing the clean copy of the master boot record to the boot time driver; and
   in the event that malicious entities are identified in the master boot record data, replacing the infected master boot record with the clean copy of the master boot record.

3. A method of claim 2, wherein the clean copy of the master boot record is created by at least one of the following processes:
   using a pattern copy of the master boot record stored in an antivirus database;
   performing user-mode reading of the master boot record, and using the returned pattern copy for disinfection; and
   reverting changes made over the infected master boot record.

4. A method of claim 2, further comprising storing the clean copy of the master boot record in a system driver registry.

5. A method of claim 2, further comprising booting the processing system by using the clean copy of the master boot record.

6. An apparatus, comprising:
   at least one processor; and
   at least one memory including executable instructions, wherein the at least one memory and the executable instructions being configured to, in cooperation with the at least one processor, cause the apparatus to perform at least the following:
   during the loading of an operating system, loading a boot time driver installed by an anti-virus application, wherein the boot time driver is installed ahead of a file system;
   reading a master boot record data by the boot time driver as soon as the operating system is ready to handle the request for reading the master boot record data, wherein the master boot record data is opened and read before a file system driver becomes available to the operating system, wherein the apparatus is configured to read the master boot record data by at least one of:
   using a notification routine that registers a reinitialization callback routine to be called by an I/O manager after all devices of the processing system have been enumerated and started,
   creating a worker thread and firing a timer with a short period to pool readiness of the reading, and
   installing a driver load notification callback that is invoked when the operating system is loading a next driver;
   analyzing the collected master boot record data to identify any malicious entities; and
   in the event that malicious entities are identified, controlling the behavior of the processing system in order to disable the malicious entity.

7. The apparatus of claim 6, wherein the apparatus is further configured to:
   create a clean copy of the master boot record by the anti-virus application;
   pass the clean copy of the master boot record to the boot time driver; and
   in the event that malicious entities are identified in the master boot record data, replace the infected master boot record with the clean copy of the master boot record.

8. The apparatus of claim 7, wherein the apparatus is configured to create the clean copy of the master boot record by at least one of the following processes:
   using a pattern copy of the master boot record stored in an antivirus database;
   performing user-mode reading of the master boot record, and using the pattern copy for disinfection; and
   reverting changes made over the infected master boot record.

9. The apparatus of claim 7, wherein the apparatus is configured to store the clean copy of the master boot record in a system driver registry.

10. The apparatus of claim 7, wherein the apparatus is configured to boot the processing system by using the clean copy of the master boot record.

11. A computer program, wherein the computer program comprises:
- code for loading a boot time driver installed by an anti-virus application during the loading of an operating system, wherein the boot time driver is installed ahead of a file system;
- code for reading a master boot record data by the boot time driver as soon as the operating system is ready to handle the request for reading the master boot record data, wherein the master boot record data is opened and read before a file system driver becomes available to the operating system, wherein the reading of the master boot record data is enabled by at least one of:
- code for using a notification routine that registers a reinitialization callback routine to be called by an I/O manager after all the devices of the processing system have been enumerated and started,
- code for creating a worker thread and firing a timer with a short period to pool readiness of the reading, and
- code for installing a driver load notification callback that is invoked when the operating system is loading a next driver;
- code for analyzing the collected master boot record data to identify any malicious entities; and
- code for controlling the behavior of the processing system in order to disable the malicious entity in the event that malicious entities are identified, when the computer program is run on a processor.

12. The computer program according to claim 11, wherein the computer program is a computer program product comprising a computer-readable medium bearing computer program code embodied therein for use with a computer.

13. The computer program according to claim 11, further comprising:
- code for creating a clean copy of the master boot record by the anti-virus application;
- code for passing the clean copy of the master boot record to the boot time driver; and
- code for replacing the infected master boot record with the clean copy of the master boot record in the event that malicious entities are identified in the master boot record data.

14. The computer program according to claim 13, wherein the clean copy of the master boot record is created by at least one of the following processes:
- using a pattern copy of the master boot record stored in an antivirus database;
- performing user-mode reading of the master boot record, and using the returned pattern copy for disinfection; and
- reverting changes made over the infected master boot record.

* * * * *

UNITED STATES PATENT AND TRADEMARK OFFICE
CERTIFICATE OF CORRECTION

PATENT NO. : 9,342,694 B2
APPLICATION NO. : 14/131004
DATED : May 17, 2016
INVENTOR(S) : Kimmo Kasslin et al.

It is certified that error appears in the above-identified patent and that said Letters Patent is hereby corrected as shown below:

In the Claims

In Claim 3:
Column 8, line 4, "the returned" should be deleted and --returned-- should be inserted.

In Claim 14:
Column 10, line 23, "the returned" should be deleted and --returned-- should be inserted.

Signed and Sealed this
Second Day of August, 2016

Michelle K. Lee
*Director of the United States Patent and Trademark Office*